(12) United States Patent
da Silva et al.

(10) Patent No.: US 11,451,991 B2
(45) Date of Patent: *Sep. 20, 2022

(54) ENHANCED MEASUREMENT FILTERING CONFIGURATIONS FOR RADIO-LINK MANAGEMENT AND RADIO RESOURCE MANAGEMENT

(71) Applicant: Telefonaktiebolaget LM Ericsson (publ), Stockholm (SE)

(72) Inventors: Icaro L. J. da Silva, Solna (SE); Muhammad Kazmi, Sundbyberg (SE); Helka-Liina Määttanen, Helsinki (FI); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

This patent is subject to a terminal disclaimer.

(21) Appl. No.: 16/819,342

(22) Filed: Mar. 16, 2020

(65) Prior Publication Data
US 2020/0221328 A1 Jul. 9, 2020

Related U.S. Application Data

(63) Continuation of application No. 16/234,702, filed on Dec. 28, 2018, now Pat. No. 10,631,189, which is a
(Continued)

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 7/0619* (2013.01);
(Continued)

(58) Field of Classification Search
CPC .... H04B 7/0619; H04B 17/30; H04B 7/0617; H04B 7/04; H04B 17/309; H04B 7/0408;
(Continued)

(56) References Cited

U.S. PATENT DOCUMENTS 10,631,189 B2 * 4/2020 da Silva .............. H04L 41/0677
2014/0105042 A1 4/2014 Cui et al.
(Continued)

FOREIGN PATENT DOCUMENTS

CN 104303544 A 1/2015
CN 104823474 A 8/2015
(Continued)

OTHER PUBLICATIONS

"UE's Role in LTE Advanced Heterogeneous Networks"; Damnjanovic et al.; IEEE Magazine; Feb. 2012 (Year: 2012).*
(Continued)

*Primary Examiner* — Benjamin H Elliott, IV
(74) *Attorney, Agent, or Firm* — Murphy, Bilak & Homiller, PLLC

(57) ABSTRACT

A wireless device is configured to perform measurements for radio resource management (RRM) and/or radio link monitoring (RLM). The wireless device performs a plurality of radio measurements. The wireless device filters at least a first subset of the radio measurements using a first filtering configuration and filters at least a second subset of the radio measurements using a second filtering configuration, where the second filtering configuration differs from the first filtering configuration. The first and second filtering configurations apply to first and second different types of reference signals, respectively, or to beam-level measurements and cell-level measurements, respectively.

28 Claims, 8 Drawing Sheets

Related U.S. Application Data continuation of application No. PCT/SE2018/050910, filed on Sep. 11, 2018.

(60) Provisional application No. 62/556,844, filed on Sep. 11, 2017.

(51) Int. Cl.
| | | |
|---|---|---|
| *H04L 5/00* | (2006.01) | |
| *H04B 17/30* | (2015.01) | |
| *H04W 76/18* | (2018.01) | |
| *H04L 41/0677* | (2022.01) | |
| *H04W 56/00* | (2009.01) | |
| *H04B 7/04* | (2017.01) | |

(52) U.S. Cl.
CPC ............ *H04B 17/30* (2015.01); *H04L 5/005* (2013.01); *H04L 41/0677* (2013.01); *H04W 56/001* (2013.01); *H04W 76/18* (2018.02); *H04B 7/04* (2013.01)

(58) Field of Classification Search
CPC ....... H04B 7/0695; H04B 7/088; H04L 5/005; H04L 41/0677; H04W 24/10; H04W 76/18; H04W 56/001
See application file for complete search history.

(56) References Cited

U.S. PATENT DOCUMENTS

| | | | |
|---|---|---|---|
| 2014/0133333 A1 | 5/2014 | Liu et al. | |
| 2014/0133465 A1 | 5/2014 | Johansson et al. | |
| 2014/0247741 A1* | 9/2014 | Yamada ................ | H04W 24/10 370/252 |
| 2014/0248840 A1 | 9/2014 | Karri et al. | |
| 2015/0208296 A1* | 7/2015 | Song .............. | H04W 36/00835 370/331 |
| 2015/0215856 A1 | 7/2015 | Kim et al. | |
| 2015/0237516 A1* | 8/2015 | Michel ................. | H04W 24/10 370/252 |
| 2015/0289141 A1* | 10/2015 | Ghasemzadeh ....... | H04W 16/14 370/330 |
| 2017/0111810 A1 | 4/2017 | Awada et al. | |
| 2017/0208494 A1* | 7/2017 | Moon .................. | H04B 7/0695 |
| 2017/0324459 A1 | 11/2017 | Koskela et al. | |
| 2018/0007574 A1* | 1/2018 | Park ......................... | H04B 7/04 |
| 2018/0199328 A1 | 7/2018 | Sang et al. | |
| 2018/0205483 A1 | 7/2018 | Nagaraja et al. | |
| 2018/0242183 A1* | 8/2018 | Bergstrom .............. | H04L 5/001 |
| 2018/0323850 A1 | 11/2018 | Baligh et al. | |
| 2018/0368054 A1 | 12/2018 | Sheng et al. | |
| 2019/0028348 A1* | 1/2019 | Chai .................. | H04W 36/0085 |
| 2019/0090205 A1 | 3/2019 | Gong et al. | |
| 2019/0174385 A1 | 6/2019 | Sang et al. | |
| 2020/0221328 A1* | 7/2020 | da Silva ................ | H04W 76/18 |

FOREIGN PATENT DOCUMENTS

| | | |
|---|---|---|
| RU | 2572612 C1 | 1/2016 |
| RU | 2621678 C2 | 6/2017 |
| WO | 2012173570 A1 | 12/2012 |
| WO | 2016053178 A1 | 4/2016 |
| WO | 2017118898 A1 | 7/2017 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.3.0, Jun. 2016, 1-331.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017, 1-745.

3GPP, "3rd Generation Partnership Project; Technical Specification Group Radio Access Network; Evolved Universal Terrestrial Radio Access (E-UTRA); Requirements for support of radio resource management (Release 14)", 3GPP TS 36.133 V14.3.0, Mar. 2017, 1-2387.

3GPP, "3rd Generation Partnership Project; Technical Specification Group Radio Access Network; NR; NR and NG-RAN Overall Description; Stage 2 (Release 15)", 3GPP TS 38.300 V0.7.0, Aug. 2017, 1-60.

3GPP, "3rd Generation Partnership Project; Technical Specification Group Radio Access Network; NR; NR and NG-RAN Overall Description; Stage 2 (Release 15)", 3GPP TS 38.300 V1.0.0, Sep. 2017, 1-59.

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.

Unknown, Author, "Configurations for cell quality derivation and beam reporting", CATT, 3GPP TSG-RAN WG2 #99, R2-1707902, Berlin, Germany, Aug. 21-25, 2017, 1-4.

Unknown, Author, "Measurement configuration and reporting for mobility considering beamforming", Huawei, HiSilicon, 3GPP TSG-RAN2 Meeting #98, R2-1705527, Hangzhou, China, May 15-19, 2017, 1-4.

Unknown, Author, "Measurement configuration and reporting, signalling baseline", Samsung, 3GPP TSG-RAN WG2 meeting #99, R2-1709486, Berlin, Germany, Aug. 21-25, 2017, 1-12.

Unknown, Author, "Measurement Configuration with NR-SS and CSI-RS", MediaTek Inc., 3GPP TSG.RAN WG2 Meeting #99, R2-1708005, Berlin, Germany, Aug. 21-25, 2017, 1-5.

Unknown, Author, "Summary of [NR-AH2#13][NR/RRM]TP on RRM", Ericsson, 3GPP TSG-RAN WG2 #NR Ad Hoc, R2-1707855, Berlin, Germany, Aug. 21-25, 2017, 1-26.

Unknown, Author, "Summary of email discussion 99#32[NR] Tp on RRM", Ericsson, 3GPPTSG-RANWG2 #99-bis, R2-1710839, Prague, Czech, Oct. 9-13, 2017, 1-28.

Unknown, Author, "Radio Link Monitoring", 3GPP TSG RAN WG1#90, R1-171585, Prague, Czech Republic, Aug. 21-25, 2017, 1-5.

Unknown, Author , "Radio Link Monitoring", 3GPP TSG RAN WG1#90, R1-1713565, Prague, Czech Republic, Aug. 21-25, 2017, 1-5.

Unknown, Author, "Email discussion report [97bis#37][LTE/feMTC] Enhanced RLM", 3GPP TSG-RAN2 Meeting #98, R2-1705034, Hangzhou, China, May 15-19, 2017, 1-7.

Unknown, Author, "NR RRM measurement model", 3GPP TSG-RAN WG2 2017 RAN2 Ad-hoc Meeting R2-1707310, Qingdao, China, Jun. 27-29, 2017, 1-5.

* cited by examiner

600

SEND, TO A WIRELESS DEVICE, INFORMATION
INDICATING A FIRST FILTERING CONFIGURATION FOR
RRM AND/OR RLM AND A SECOND FILTERING
CONFIGURATION FOR RRM AND/OR RLM, THE SECOND
FILTERING CONFIGURATION DIFFERING FROM THE FIRST
FILTERING CONFIGURATION;
WHERE THE FIRST AND SECOND FILTERING
CONFIGURATIONS APPLY TO FIRST AND SECOND
DIFFERENT TYPES OF REFERENCE SIGNALS,
RESPECTIVELY, OR TO BEAM-LEVEL MEASUREMENTS
AND CELL-LEVEL MEASUREMENTS, RESPECTIVELY
602

*FIG. 6*

ENHANCED MEASUREMENT FILTERING CONFIGURATIONS FOR RADIO-LINK MANAGEMENT AND RADIO RESOURCE MANAGEMENT

TECHNICAL FIELD

The present disclosure is generally related to wireless communications and is more particularly related to performing and filtering radio measurements for radio link monitoring (RLM) and/or radio resource management (RRM).

BACKGROUND

For wireless communications networks compliant with the specifications for Long-Term Evolution (LTE) networks, the $3^{rd}$-Generation Partnership Project (3GPP) has defined a so-called measurement model, in 3GPP TS 36.300, v. 14.3.0 (June 2017) (hereinafter referred to as "36.300"), as a way to summarize how a user equipment (UE) perform radio-resource management (RRM) measurements to be used as input to the evaluation of measurement reports and to be reported to the network, e.g., to assist handover decisions. FIG. 1, which is adapted from FIG. 10.6-1 of 36.300, summarizes the measurement model in LTE. The components and parameters shown in FIG. 1 are described in 36.300 as follows:

A: measurements (samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) is not constrained by the standard.

B: A measurement reported by layer 1 to layer 3 after layer 1 filtering.

Layer 3 filtering: Filtering performed on the measurements provided at point B. The behaviour of the Layer 3 filters is standardised and the configuration of the layer 3 filters is provided by RRC signalling. Filtering reporting period at C equals one measurement period at B.

C: A measurement after processing in the layer 3 filter. The reporting rate is identical to the reporting rate at point B. This measurement is used as input for one or more evaluation of reporting criteria.

Evaluation of reporting criteria: This checks whether actual measurement reporting is necessary at point D. The evaluation can be based on more than one flow of measurements at reference point C, such as to compare between different measurements. This is illustrated by inputs C and C'. The UE shall evaluate the reporting criteria at least every time a new measurement result is reported at point C, C'. The reporting criteria are standardised and the configuration is provided by RRC signalling (UE measurements).

D: Measurement report information (message) sent on the radio interface.

According to 36.300, in LTE, the Layer 1 filtering 100 will introduce a certain level of measurement averaging. How and when the UE exactly performs the required measurements will be implementation-specific to the point that the output set in B fulfils the performance requirements set in 3GPP TS 36.133 ("Evolved Universal Terrestrial Radio Access (E-UTRA); Requirements for support of radio resource management"). Layer 3 filtering 110 and parameters used are specified in 3GPP TS 36.331 ("Evolved Universal Terrestrial Radio Access (E-UTRA); Radio Resource Control (RRC) protocol specification"); this filtering does not introduce any delay in the sample availability between B and C. Measurements at point C, C' are the inputs used in the event evaluation 120. One of the reasons to specify the configuration described above is to align different implementations of Layer 1 (L1) filters.

In LTE, the Layer 3 (L3) filter coefficients are provided as part of the so-called quantity configuration, defined in 3GPP TS 36.331, v. 14.3.0 (June 2017) (hereinafter referred to as "36.331") as follows:

4. Quantity configurations: One quantity configuration is configured per RAT type. The quantity configuration defines the measurement quantities and associated filtering used for all event evaluation and related reporting of that measurement type. One filter can be configured per measurement quantity.

. . .

In LTE, an information element (IE) named quantityConfig is defined. The IE is transmitted as part of the measurement configuration. The UE actions in the specifications are defined as follows:

. . .

1> if the received measConfig includes the quantityConfig:

2> perform the quantity configuration procedure as specified in 5.5.2.8;

. . .

5.5.2.8 Quantity Configuration

The UE shall:

1> for each RAT for which the received quantityConfig includes parameter(s):

2> set the corresponding parameter(s) in quantityConfig within
        VarMeasConfig to the value of the received quantityConfig parameter(s);

1> for each measId included in the measIdList within VarMeasConfig:

2> remove the measurement reporting entry for this measId from the VarMeasReportList, if included;

2> stop the periodical reporting timer or timer T321, whichever one is running, and reset the associated information (e.g., timeToTrigger) for this measId;

. . .

Details about the L3 filtering are also specified in the RRC specifications as follows:

5.5.3.2 Layer 3 Filtering

The UE shall:

1> for each measurement quantity that the UE performs measurements according to 5.5.3.1:

NOTE 1: This does not include quantities configured solely for UE Rx-Tx time difference, SSTD measurements and RSSI, channel occupancy measurements, WLAN measurements of Band, Carrier Info, Available Admission Capacity, Backhaul Bandwidth, Channel Utilization, and Station Count, CBR measurement, and UL PDCP Packet Delay per QCI measurement i.e., for those types of measurements the UE ignores the trigger Quantity and report Quantity.

2> filter the measured result, before using for evaluation of reporting criteria or for measurement reporting, by the following formula:

$$F_n = (1-a) \cdot F_{n-1} + a \cdot M_n$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received; and $a=1/2^{(k/4)}$, where k is the filterCoefficient for the corresponding measurement quantity received by the quantityConfig;

2> adapt the filter such that the time characteristics of the filter are preserved at different input rates, observing that the filterCoefficient k assumes a sample rate equal to 200 ms;

NOTE 2: If k is set to 0, no layer 3 filtering is applicable.

NOTE 3: The filtering is performed in the same domain as used for evaluation of reporting criteria or for measurement reporting, i.e., logarithmic filtering for logarithmic measurements.

NOTE 4: The filter input rate is implementation dependent, to fulfil the performance requirements set in [16]. For further details about the physical layer measurements, see TS 36.133 [16].

. . .

The IE MeasConfig specifies measurements to be performed by the UE, and covers intra-frequency, inter-frequency and inter-RAT mobility as well as configuration of measurement gaps. This IE is defined in 3GPP specifications as follows:

| MeasConfig information element |  |
| --- | --- |
| -- ASN1START | |
| MeasConfig ::=    SEQUENCE { | |
| -- Measurement objects | |
| measObjectToRemoveList | MeasObjectToRemoveList |
| OPTIONAL, --Need ON | |
| measObjectToAddModList | MeasObjectToAddModList |
| OPTIONAL, --Need ON | |
| -- Reporting configurations | |
| reportConfigToRemoveList | ReportConfigToRemoveList |
| OPTIONAL, --Need ON | |
| reportConfigToAddModList | ReportConfigToAddModList |
| OPTIONAL, --Need ON | |
| -- Measurement identities | |
| measIdToRemoveList | MeasIdToRemoveList |
| OPTIONAL, --Need ON | |
| measIdToAddModList | |
| MeasIdToAddModList | |
| OPTIONAL, --Need ON | |
| -- Other parameters | |
| quantityConfig | QuantityConfig |
| OPTIONAL, -- Need ON | |
| . . . | |
| -- ASN1STOP | |

The IE QuantityConfig specifies the measurement quantities and layer 3 filtering coefficients for E-UTRA and inter-RAT measurements. This IE is defined in 3GPP specifications as follows:

| QuantityConfig information element | | |
| --- | --- | --- |
| -- ASN1START | | |
| QuantityConfig ::= | SEQUENCE { | |
| quantityConfigEUTRA | | |
| QuantityConfigEUTRA | OPTIONAL, | --Need ON |
| . . . | | |
| } | | |
| . . . | | |
| QuantityConfigEUTRA ::= | | SEQUENCE { |
| filterCoefficientRSRP | | FilterCoefficient |
| DEFAULT fc4, | | |
| filterCoefficientRSRQ | | FilterCoefficient |
| DEFAULT fc4 | | |
| } | | |
| QuantityConfigEUTRA-v1250 ::= | | SEQUENCE { |
| filterCoefficientCSI-RSRP-r12 | | FilterCoefficient |
| OPTIONAL  -- Need OR | | |
| } | | |
| QuantityConfigEUTRA-v1310 ::= | | SEQUENCE { |
| filterCoefficientRS-SINR-r13 | | FilterCoefficient |
| DEFAULT fc4 | | |
| } | | |
| ... | | |
| -- ASN1STOP | | |

As for QuantityConfig field descriptions: filterCoefficientCSI-RSRP specifies the filtering coefficient used for CSI-RSRP; filterCoefficientRSRP specifies the filtering coefficient used for RSRP; filterCoefficientRSRQ specifies the filtering coefficient used for RSRQ; filterCoefficientRS-SINR specifies the filtering coefficient used for RS-SINR; and quantityConfigEUTRA specifies filter configurations for E UTRA measurements.

The IE FilterCoefficient specifies the measurement filtering coefficient. Value fc0 corresponds to k=0, fc1 corresponds to k=1, and so on. This IE is defined in 3GPP specifications as follows:

| FilterCoefficient information element |
| --- |
| -- ASN1START |
| FilterCoefficient ::=    ENUMERATED { |
| fc0, fc1, fc2, fc3, fc4, fc5, |
| fc6, fc7, fc8, fc9, fc11, fc13, |
| fc15, fc17, fc19, spare1, ...} |
| -- ASN1STOP |

The legacy radio link monitoring procedure is carried out in RRC_CONNECTED state by the UE. (For the purposes of this document, the term "legacy" is used to refer to standardized processes and procedures as of Release 14 of the 3GPP specifications, and earlier.) The purpose of radio link monitoring (RLM) is to monitor the downlink radio link quality of the connected serving cell and use that information to decide whether the UE is in in-sync or out-of-sync with respect to that serving cell. In legacy RLM procedures, the UE estimates the signal quality of the downlink reference signal (e.g., cell-specific reference symbols (CRS) in LTE) of the serving cell and compares the estimated signal quality with hypothetical control channel quality targets (e.g., physical downlink control channel block error rate (PDCCH BLER) targets). There are two control channel quality targets (e.g., BLER targets), namely Qin and Qout. Qout corresponds to a 10% hypothetical BLER of the control channel (e.g., PDCCH) and Qin corresponds to 2% hypothetical BLER of the control channel (e.g., PDCCH channel). These quality thresholds are used to determine whether the UE is in-sync or out-of-sync with respect to the serving cell.

The RLM procedure in LTE also has a filtering configuration that aims to avoid an RLF declaration (which triggers RRC signaling and costly UE actions) upon a quick drop in radio condition. Although the purpose is somewhat similar to the filtering applied to avoid too frequent trigger of measurement reports, the configuration of this filtering mechanism is different, being based on the parameters N310 and N311 (instead of the time-domain filtering coefficients in the RRM measurement model). For RLM, the UE starts the radio link failure timer T310 when N310 consecutive out-of-sync indications are reached, and stops this timer when N311 consecutive in-sync indications are reached. Upon expiry of the T310 timer, the UE declares RLF and turns off the transmitter. The parameters N310, N311 and T310 are configured by the network node. The parameters N310 and N311 are used by the UE for performing higher layer time-domain average and are also interchangeably referred to as higher-layer filtering parameters, layer-3 filtering parameters, etc.

In discussions and documentation for the fifth-generation wireless system currently under development by the 3GPP, the radio access technology (RAT) may be referred to as "New Radio," or "NR," or "NR Radio Access." Stage 2 specifications for NR, which comprise an overall description of NR and the so-called Next Generation Radio Access Network (NG-RAN), have been released in 3GPP TS 38.300, v. 1.0.0 (September 2017) (hereinafter referred to as 38.300); the background described herein may be familiar to the person of ordinary skill in the art.

In NR, an NR primary synchronization signal (NR-PSS), an NR secondary synchronization signal (NR-SSS), and an NR physical broadcast channel (NR-PBCH) are expected to be transmitted together, in a synchronization signal block (SS block). For a given frequency band, an SS block corresponds to N OFDM symbols based on the default subcarrier spacing, where the N symbols contain NR-PSS, NR-SSS, and NR-PBCH e.g., N=4. The position(s) of actual transmitted SS-blocks can be informed to the UE for helping CONNECTED/IDLE mode measurement, for helping a CONNECTED mode UE to receive downlink data/control in unused SS-blocks, and potentially for helping IDLE mode UE to receive downlink data/control in unused SS-blocks. One or multiple SS block(s) make up an SS burst set. The maximum number of SS-blocks, L, within a SS burst set is dependent on carrier frequency of the cell. The maximum number of SS-blocks within a SS burst set, L, for each of several different frequency ranges is as follows: for frequency range up to 3 GHz, L=4; for frequency range from 3 GHz to 6 GHz, L=8; and for frequency range from 6 GHz to 52.6 GHz, L=64.

A certain minimum number of SS blocks transmitted within each SS burst set will be used to define UE measurement performance requirements.

The transmission of SS blocks within an SS burst set is confined to a 5-millisecond window, regardless of SS burst set periodicity. Within this 5-millisecond window, the number of possible candidate SS block locations is L (as described above). The SS blocks within the same SS burst set in a cell may or may not be contiguous in time.

Aspects of NR are beam-based, rather than cell-based, where a given access point (referred to as a gNB, in NR documentation), may transmit multiple beam-formed beams, using antenna arrays. Network controlled mobility in NR thus comprises two types of mobility: cell-level mobility and beam-level mobility, as discussed in 38.300. RLM and RRM measurement techniques have not been fully specified for NR.

SUMMARY

According to several embodiments of the techniques described herein, the network node (e.g., gNB, base station, access point, etc.) can configure the UE with a measurement filtering configuration with different levels of granularity for different reference signal (RS) types for beam-level measurements and cell-level measurements. Embodiments also comprise filtering differentiation for single-beam and multi-beam network configurations.

A filtering configuration parameter (e.g., coefficient of layer-3 filter) for beam-level measurements may further depend upon the beam configuration (e.g., number of beams to be measured, number of SS blocks within the SS burst set, etc.), in some embodiments.

Embodiments may thus involve the use of different measurement (or measurement indications) filtering configurations for: cell level vs beam level configurations and RS Type. Measurement (or measurement indication) filtering configurations may relate to one or both of: time domain filtering of RRM measurements used as input for report triggering evaluation; and RLF related parameters (NR-N310, NR-311, RLF timers, maximum number of beam recovery attempts, etc.)

In various embodiments, the UE determines a measurements filtering configuration for an NR measurement based on at least one of: a received message from a network node and pre-defined rule.

According to some embodiments, a method, in a wireless device, of performing measurements for radio RRM and/or RLM, includes performing a plurality of radio measurements. The method also includes filtering at least a first subset of the radio measurements using a first filtering configuration and filtering at least a second subset of the radio measurements using a second filtering configuration, the second filtering configuration differing from the first filtering configuration. The first and second filtering configurations apply to first and second different types of reference signals, respectively, or to beam-level measurements and cell-level measurements, respectively.

According to some embodiments, a method, in at least one network node of a wireless communication network, of facilitating measurements for RRM and/or RLM, includes sending, to a wireless device, information indicating a first filtering configuration for RRM and/or RLM and a second filtering configuration for RRM and/or RLM, the second filtering configuration differing from the first filtering configuration. The first and second filtering configurations apply to first and second different types of reference signals, respectively, or to beam-level measurements and cell-level measurements, respectively.

According to some embodiments, a wireless device configured for performing measurements for radio RRM and/or RLM includes transceiver circuitry configured to transmit and receive radio signals and processing circuitry operatively associated with the transceiver circuitry. The processing circuitry is configured to perform a plurality of radio measurements, filter at least a first subset of the radio measurements using a first filtering configuration, and filter at least a second subset of the radio measurements using a second filtering configuration, where the second filtering configuration differs from the first filtering configuration. The first and second filtering configurations apply to first and second different types of reference signals, respectively, or to beam-level measurements and cell-level measurements, respectively.

According to some embodiments, at least one network node of a wireless communication network configured for facilitating measurements for RRM and/or RLM includes transceiver circuitry configured to communicate with a wireless device and processing circuitry operatively associated with the transceiver circuitry. The processing circuitry is configured to send, to the wireless device via transceiver circuitry, information indicating a first filtering configuration for RRM and/or RLM and a second filtering configuration for RRM and/or RLM, the second filtering configuration differing from the first filtering configuration. The first and second filtering configurations apply to first and second different types of reference signals, respectively, or to beam-level measurements and cell-level measurements, respectively.

Additional embodiments may include the method implemented by apparatus, devices, network nodes, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 6 shows a flow chart illustrating a method at a source node for facilitating measurements for RRM and/or RLM, according to some embodiments.

DETAILED DESCRIPTION

Figure 1:
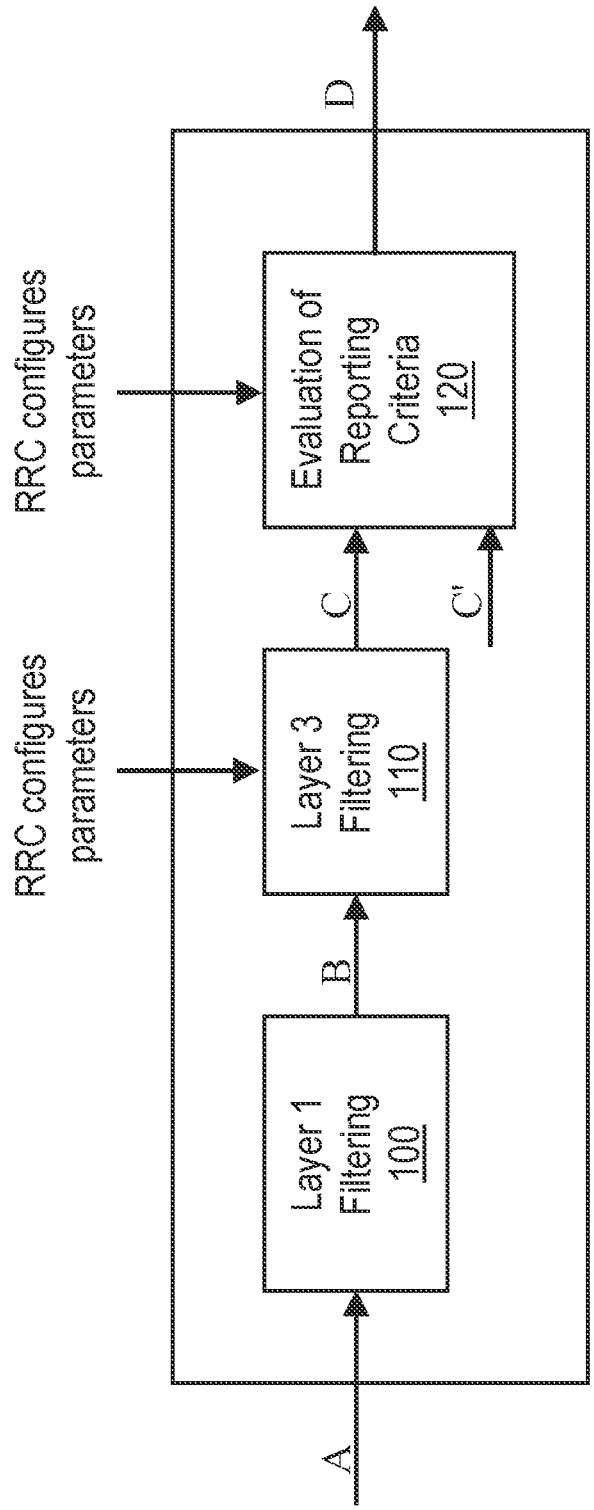
FIG. 1 illustrates a measurement model in LTE.
Figure 2:
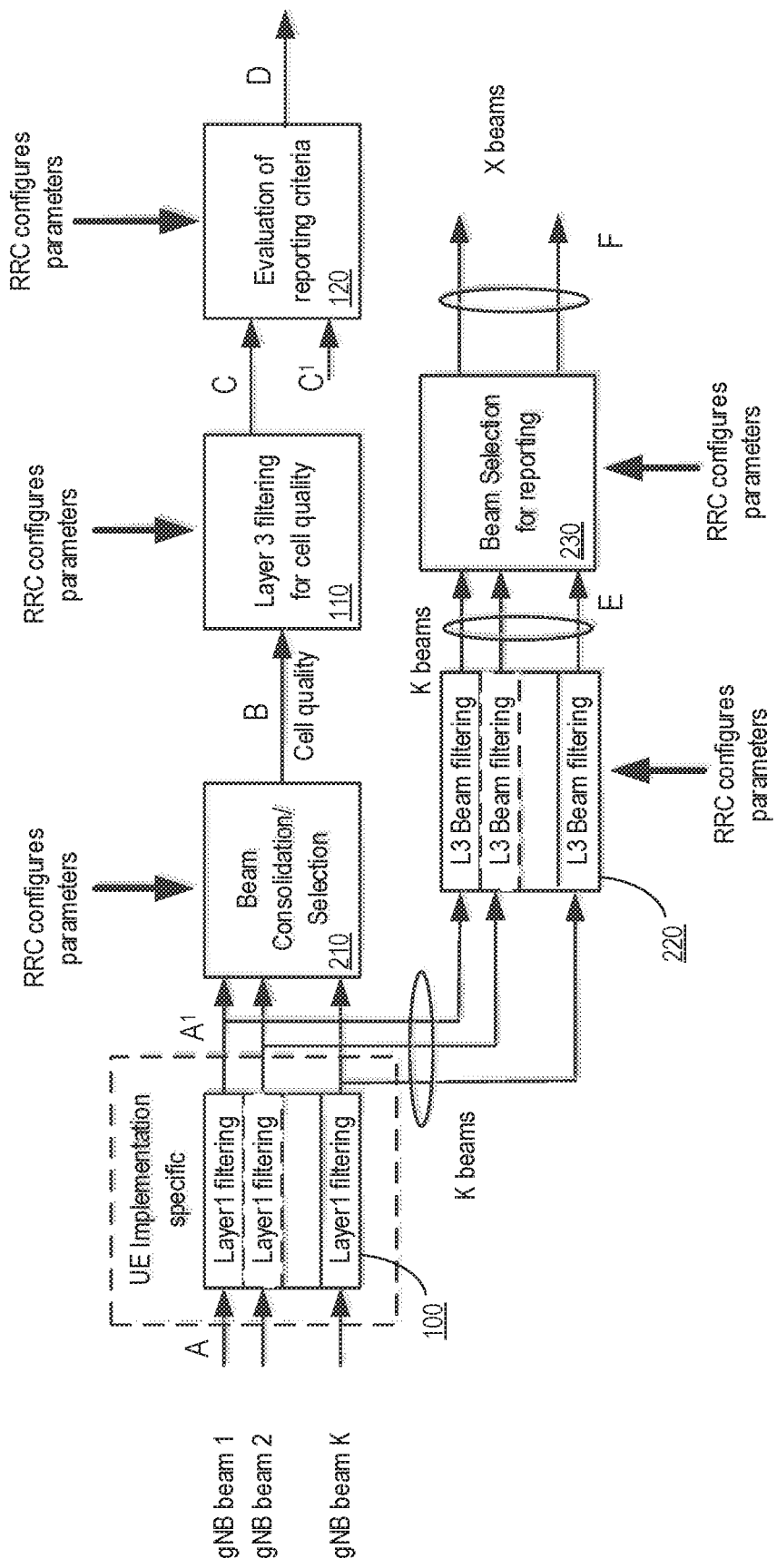
FIG. 2 illustrates a high-level measurement model.

For the case of RRM measurements in NR, the following measurement model has been captured in TS 38.300. In RRC_CONNECTED state, the UE measures multiple beams (at least one) of a cell and the measurements results (power values) are averaged to derive the cell quality. In doing so, the UE is configured to consider a subset of the detected beams: the best and the N−1 best beams above a configurable absolute threshold. The network can also configure the UE to perform Layer 3 (L3)-filtered beam-level measurements to be included in measurement reports. The corresponding high-level measurement model is illustrated in FIG. 2, which is adapted from FIG. 9.2.4-1 of TS 38.300. The components and parameters illustrated in this measurement model are described in TS 38.300 as follows:

NOTE: K beams correspond to the measurements on NR-SS block or CSI-RS resources configured for L3 mobility by gNB and detected by UE at L1.

A: measurements (beam-specific samples) internal to the physical layer.

Layer 1 filtering: internal layer-1 filtering of the inputs measured at point A. Exact filtering is implementation dependent. How the measurements are actually executed in the physical layer by an implementation (inputs A and Layer 1 filtering) is not constrained by the standard.

$A^1$: measurements (i.e., beam-specific measurements) reported by layer 1 to layer 3 after layer 1 filtering.

Beam Consolidation/Selection: beam-specific measurements are consolidated to derive cell quality if N>1, else when N=1 the best beam measurement is selected to derive cell quality. The behaviour of the Beam consolidation/selection is standardised, and the configuration of this module is provided by RRC signalling. Reporting period at B equals one measurement period at $A^1$.

B: a measurement (i.e., cell quality) derived from beam-specific measurements reported to layer 3 after beam consolidation/selection.

Layer 3 filtering for cell quality: filtering performed on the measurements provided at point B. The behaviour of the Layer 3 filters is standardised, and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g., to compare between different measurements. This is illustrated by input C and $C^1$. The UE shall evaluate the reporting criteria at least every time a new measurement result is reported at point C, $C^1$. The reporting criteria are standardised and the configuration is provided by RRC signalling (UE measurements).

D: measurement report information (message) sent on the radio interface.

L3 Beam filtering: filtering performed on the measurements (i.e., beam-specific measurements) provided at point $A^1$. The behaviour of the beam filters is standardised and the configuration of the beam filters is provided by RRC signalling. Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behaviour of the beam selection is standardised and the configuration of this module is provided by RRC signalling.

F: beam measurement information included in measurement report (sent) on the radio interface.

As discussed in TS 38.300, Layer 1 filtering 210 introduces a certain level of measurement averaging. How and when the UE exactly performs the required measurements is implementation-specific to the point that the output at B fulfills the performance requirements set in 3GPP TS 38.133. Beam consolidation/selection is shown by block

210. Layer 3 filtering 230 for cell quality and related parameters used are specified in 3GPP TS 38.331, and does not introduce any delay in the sample availability between B and C. Measurement at point C, C1 is the input used in the event evaluation 240. L3 Beam filtering 220 and related parameters used are specified in 3GPP TS 38.331, and do not introduce any delay in the sample availability between E and F. Beam selection for reporting is shown by block 230.

For the case of RLM measurements, TS 38.300 says that in RRC_CONNECTED state, the UE declares RLF when one of the following criteria are met: expiry of a timer started after indication of radio problems from the physical layer (if radio problems are recovered before the timer is expired, the UE stops the timer); random access procedure failure; and RLC failure. For future study is whether indications related to beam failure recovery may affect the declaration of RLF.

After RLF is declared, the UE: stays in RRC_CONNECTED; selects a suitable cell and then initiates RRC re-establishment; and enters RRC_IDLE if a suitable cell was not found within a certain time after RLF was declared.

In dual connectivity (DC), RLF is declared separately for the master cell group (MCG) and for the secondary cell group (SCG). The actions following RLF described above only apply for RLF on the MCG. After RLF on the SCG, the UE stops normal operation on the SCG and reports the failure to the network.

One can notice that in NR, differently from LTE, new aspects are to be considered to complete the measurement model, RLM configuration. Filtering configurations may be captured in the RRC specifications: 1) the UE can be configured to perform L3-filtered beam-level RRM measurements to be included in measurement reports; and 2) the UE can be configured to perform RRM measurements based on SS Blocks (CSI-RS) or both. The UE may be requested to report cell-level measurement and/or beam-level measurements. 3) The UE can be configured to perform RLM based on NR-SS or CSI-RS, i.e., RLF can be triggered based on the radio conditions measured based on different reference signals, which could have quite different properties (considering they can be beamformed quite differently). In addition, there are currently no specified rules or signaling on how to configure UE measurement filtering for NR.

Embodiments described herein address these issues. According to several embodiments of the techniques described herein, for example, the network node (e.g., gNB, base station, access point, etc.) can configure the UE with a measurement filtering configuration with different levels of granularity for different reference signal (RS) types for beam-level measurements and cell-level measurements. Embodiments may also include filtering differentiation for single-beam and multi-beam network configurations.

A filtering configuration parameter (e.g., coefficient of Layer 3 filter) for beam-level measurements may further depend upon the beam configuration (e.g., number of beams to be measured, number of SS blocks within the SS burst set, etc.), in some embodiments.

Several advantages may be obtained with one or more of the enclosed embodiments. In the case of RRM measurements, by introducing the flexibility enabled by the techniques described herein, the network can configure beam-level measurements with different filter coefficients, compared to cell-level measurements. For example, the network may be interested to trigger handovers based on stable measurements; hence, it would set filter coefficients with longer memory, compared to beam measurements, whose memory may be important or not depending on the purpose of these measurements. For ping-pong avoidance, for example, the network may be interested to know the latest beams the UE can detect, however, for dedicated RACH allocation per beam, stable measurements might be preferred. Notice that another advantage could be that the UE could report these measurements with different filter coefficients.

When it comes to configuring different coefficients for different RS types, for cell level or beam-level measurements, an advantage of some of the techniques described herein is that the level of beamforming of these different RS Types can be quite different. That may affect the stability of the measurements, too, since, for example, the SS Block might be transmitted in wide beams (or even omnidirectional), while narrow beams carry CSI-RS.

For RLM-related measurements or measurement indications, the network can configure different values for CSI-RS and SS Block, for example. If narrow beams are deployed, there will be more situations where a deep signal-to-interference-plus-noise ratio (SINR) is detected and, the network may not want the UE to declare RLF based on these. Hence, it can make sense to have longer filtering. Similar for SS Block, where the network may want the UE to act faster, as that may be correlated with the basic coverage of common control channels of the serving cell. Signaling overhead may also be reduced in some cases.

"Filtering," in the context of the present disclosure, may include time-domain filtering of RRM measurements used as input to the evaluation of measurement report triggering criteria. In that case, filter coefficients can be configured, e.g., fc1 for the latest measurement result and fc2 for the previously filtered measurement results, such as reference signal received power (RSRP), reference signal received quality (RSRQ), or SINR. In this case, embodiments may include different filter coefficients configured per RS Types, as they may have quite different beamforming properties or different configured values for cell level and beam-level measurements.

Filtering may also include RLF-related filtering parameters such as the threshold like NR-N310 for the number of out-of-sync indications that triggers the RLF timer. The network can set the value of that threshold higher than 1 to avoid a quick deep measurement result to trigger the RLF timer too early. RLF-related filtering parameters may also include values for the RLF timer. A longer timer allows the network to have more certainty that conditions are likely not possible to be recovered, hence, in a broader sense it can be seen as a filtering configuration. RLF-related filtering parameters may include the threshold like NR-N311 for the number of in-sync indications that can stop the RLF timer. The network can set the value of that threshold higher than 1 to avoid a quick stop of the RLF timer, to only do that when there is some level of certainty that the link has really recovered. RLF-related parameters may also include the threshold on the maximum number of beam failure recovery attempts that could be configured to trigger RLF. The network can set the value of that threshold higher than 1 to avoid a too fast triggering of RLF or the RLF timer. This can be different for CSI-RS based RLM compared to SS Block based RLM. In the case of these RLF filtering parameters (timer, NR-N310, NR-311, etc.), different values coefficients can be configured per RS Type, as they may have quite different beamforming properties or different configured values for cell level and beam-level measurements.

Some embodiments might be considered to be more closely related than others to the configuration of RRM measurements. As noted above, the techniques described herein include methods where the network node (e.g., serving gNB) can configure the UE with filtering configurations with different levels of granularity for beam-level measurements and cell-level measurements.

In a first embodiment, for example, the network node can configure the UE with different filtering configurations for beam-level measurements based on a first type of reference signal (RS1) (e.g., CSI-RS) and beam-level measurements based on a second type of a reference signal (RS2) (e.g., SS Blocks). In other words, the filtering configuration can be provided per RS Type for beam-level measurements.

In a second embodiment, the network node can configure the UE with a single configuration for beam-level measurements that is valid for either RS1 (e.g., CSI-RS) or RS2 (e.g., SS Blocks) based measurements. That can still be different compared to cell-level filtering configuration.

In a third embodiment, the network node can configure the UE with filtering configuration with different levels of granularity for cell-level measurements based on RS1 (e.g., CSI-RS) and cell-level measurements based on RS1 (e.g., SS Blocks) that can still be different compared to a beam-level filtering configuration.

In a fourth embodiment, the network node can configure the UE with a single configuration for cell-level measurements that is valid for either RS1 (e.g., CSI-RS) or RS1 (e.g., SS Blocks) based measurements. That can still be different compared to a beam-level filtering configuration.

In some embodiments, a combination of the abovementioned embodiments is implemented. For example, for the highest flexibility, one could have a different filter configuration per RS type and for beam and cell measurement results. In that case, one way to encode the embodiments in the specifications is just by indicating that the filter coefficients can be different for beam/cell measurement results and based on RS1 or RS2 (e.g., SS Block/CSI-RS) based measurement results, as follows. Note that this and the following examples are based on modifications of existing 3GPP specifications.

5.5.3.2 Layer 3 Filtering
The UE shall:
1> for each measurement quantity that the UE performs measurements according to 5.5.3.1:
  2> filter the measured result, before using for evaluation of reporting criteria or for measurement reporting, by the following formula:

$$F_n = (1-a) \cdot F_{n-1} + a \cdot M_n$$

where
  $M_n$ is the latest received measurement result from the physical layer (in the case of beam measurement results) or beam consolidation function (in the case of cell measurement results);
  $F_n$ is the updated filtered measurement result, that is used for evaluation of reporting criteria (in the case of cell measurement results) or for measurement reporting (in the case of cell and beam measurement results);
  $F_{n-1}$ is the old filtered measurement result, where $F_0$ is set to $M_1$ when the first measurement result from the physical layer or beam consolidation function is received; and
  $a = 1/2^{(k/4)}$, where k is the filterCoefficient for the corresponding measurement quantity received by the quantityConfig. There can be different parameter k for cell measurement results and beam measurements results. There can also be different parameter k for measurement results based on SS Block and CSI-RS;
  2> adapt the filter such that the time characteristics of the filter are preserved at different input rates, observing that the filterCoefficient k assumes a sample rate equal to 200 ms;
NOTE 2: If k is set to 0, no layer 3 filtering is applicable.
NOTE 3: The filtering is performed in the same domain as used for evaluation of reporting criteria or for measurement reporting, i.e., logarithmic filtering for logarithmic measurements.
NOTE 4: The filter input rate is implementation dependent, to fulfil the performance requirements set in [16]. For further details about the physical layer measurements, see TS 36.133 [16]."
NOTE 5: There can be different parameter k for cell measurement results and beam measurements results.
NOTE 6: There can be different parameter k for cell measurement results and beam measurements results.

Another possible way to capture these in the 3GPP RRC specifications, as below, is by separating the functions for cell and beam measurement results, and, in each of them, indicating that filter coefficients for SS Block and CSI-RS measurement results can be different.

5.5.3.2.1 Layer 3 Filtering of Cell Measurement Results
The UE shall:
1> for each cell measurement quantity that the UE performs measurements according to 5.5.3.1:
  2> filter the cell measured result, before using for evaluation of reporting criteria or for measurement reporting, by the following formula:

$$F_n = (1-a) \cdot F_{n-1} + a \cdot M_n$$

where
  $M_n$ is the latest received measurement result from the beam consolidation/selection (cell quality derivation) function as defined in 5.5.x.y;
  $F_n$ is the updated filtered cell measurement result, that is used for evaluation of reporting criteria or for measurement reporting;
  $F_{n-1}$ is the old filtered cell measurement result, where $F_0$ is set to $M_1$ when the first measurement result from the beam consolidation/selection (cell quality derivation) function as defined in 5.5.x.y is received; and
  $a = 1/2(k/4)$, where k is the filterCoefficient for the corresponding cell measurement quantity received by the quantityConfig, where k can be configured differently for cell measurement results based on SS Block and CSI-RS;
  2> adapt the filter such that the time characteristics of the filter are preserved at different input rates, observing that the filterCoefficient k assumes a sample rate equal to 200 ms;
NOTE 2: If k is set to 0, no layer 3 filtering is applicable.
NOTE 3: The filtering is performed in the same domain as used for evaluation of reporting criteria or for measurement reporting, i.e., logarithmic filtering for logarithmic measurements.
NOTE 4: The filter input rate is implementation dependent, to fulfil the performance requirements set in [16]. For further details about the physical layer measurements, see TS 36.133 [16].

5.5.3.2.2 Layer 3 Filtering of Beam Measurement Results
The UE shall:
1> for each beam measurement quantity that the UE performs measurements according to 5.5.3.1:
  2> filter the beam measured result, before using for measurement reporting, by the following formula:

$$F_n = (1-a) \cdot F_{n-1} + a \cdot M_n$$

where
$M_n$ is the latest received measurement result from the physical layer;
$F_n$ is the updated filtered beam measurement result, that is used for measurement reporting;
$F_{n-1}$ is the old filtered beam measurement result, where $F_0$ is set to $M_1$ when the first measurement result from the physical layer is received; and
a=1/2(k/4), where k is the filterCoefficient for the corresponding beam measurement quantity received by the quantityConfig, where k can be configured differently for beam measurement results based on SS Block and CSI-RS;
  2> adapt the filter such that the time characteristics of the filter are preserved at different input rates, observing that the filterCoefficient k assumes a sample rate equal to 200 ms;
NOTE 2: If k is set to 0, no layer 3 filtering is applicable.
NOTE 3: The filtering is performed in the same domain as used for evaluation of reporting criteria or for measurement reporting, i.e., logarithmic filtering for logarithmic measurements.
NOTE 4: The filter input rate is implementation dependent, to fulfil the performance requirements set in [16]. For further details about the physical layer measurements, see TS 36.133 [16].

Another possible way to capture these in the 3GPP RRC specifications, as below, is by separating the functions for cell and beam measurement results, and, in each of them, indicating that filter coefficients for SS Block and CSI-RS measurement results can be different.

5.5.3.2.1 Layer 3 filtering of cell measurement results
The UE shall:
1> for each cell measurement quantity that the UE performs measurements according to 5.5.3.1:
  2> filter the cell measured result, before using for evaluation of reporting criteria or for measurement reporting, by the following formula:

$$F_n = (1-a) \cdot F_{n-1} + a \cdot M_n$$

where
$M_n$ is the latest received measurement result from the beam consolidation/selection (cell quality derivation) function as defined in 5.5.x.y;
$F_n$ is the updated filtered cell measurement result, that is used for evaluation of reporting criteria or for measurement reporting;
$F_{n-1}$ is the old filtered cell measurement result, where $F_0$ is set to $M_1$ when the first measurement result from the beam consolidation/selection (cell quality derivation) function as defined in 5.5.x.y is received; and
$a=1/2^{(k/4)}$, where k is the filterCoefficient for the corresponding cell measurement quantity received by the quantityConfig, where k can be configured differently for cell measurement results based on SS Block and CSI-RS;
  2> adapt the filter such that the time characteristics of the filter are preserved at different input rates, observing that the filterCoefficient k assumes a sample rate equal to 200 ms;

---

QuantityConfig
The IE QuantityConfig specifies the measurement quantities and layer 3 filtering coefficients for NR and inter-RAT measurements.
QuantityConfig information element

---

```
-- ASN1START
QuantityConfig ::=         SEQUENCE {
    quantityConfigNR             QuantityConfigNR    OPTIONAL,
        -- Need ON
QuantityConfigNR::=        SEQUENCE {
    quantityConfigCell           QuantityConfigRS
    quantityConfigBeam           QuantityConfigRS    OPTIONAL,
}
QuantityConfigRS ::=       SEQUENCE {
    // SS Block based
    ssbFilterCoefficientRSRP     FilterCoefficient   DEFAULT fc4,
    ssbFilterCoefficientRSRQ     FilterCoefficient   DEFAULT fc4,
    ssbFilterCoefficientRS-SINR  FilterCoefficient   DEFAULT fc4,
    // CSI-RS based
    csi-rsFilterCoefficientRSRP     FilterCoefficient   DEFAULT fc4,
    csi-rsFilterCoefficientRSRQ     FilterCoefficient   DEFAULT fc4,
    csi-rsFilterCoefficientRS-SINR  FilterCoefficient   DEFAULT fc4,
}
...
-- ASN1STOP
```

NOTE 2: If k is set to 0, no layer 3 filtering is applicable.

NOTE 3: The filtering is performed in the same domain as used for evaluation of reporting criteria or for measurement reporting, i.e., logarithmic filtering for logarithmic measurements.

NOTE 4: The filter input rate is implementation dependent, to fulfil the performance requirements set in [16].

For further details about the physical layer measurements, see TS 36.133 [16].

QuantityConfig

The IE Quantity Config specifies the measurement quantities and layer 3 filtering coefficients for NR and inter-RAT measurements.

| QuantityConfig information element |
|---|
| ``` |
| -- ASN1START |
| QuantityConfig ::=           SEQUENCE { |
|     quantityConfigNR              QuantityConfigNR OPTIONAL, -- Need ON |
| QuantityConfigNR::=          SEQUENCE { |
|     quantityConfigCell            QuantityConfigRS |
|     quantityConfigBeam            QuantityConfigRS OPTIONAL, |
| } |
| QuantityConfigRS ::=         SEQUENCE { |
|     // SS Block based |
|     ssbFilterCoefficientRSRP             FilterCoefficient    DEFAULT fc4, |
|     ssbfilterCoefficientRSRQ             FilterCoefficient    DEFAULT fc4, |
|     ssbFilterCoefficientRS-SINR          FilterCoefficient    DEFAULT fc4, |
|     // CSI-RS based |
|     csi-rsFilterCoefficientRSRP          FilterCoefficient    DEFAULT fc4, |
|     csi-rsFilterCoefficientRSRQ          FilterCoefficient    DEFAULT fc4, |
|     csi-rsFilterCoefficientRS-SINR       FilterCoefficient    DEFAULT fc4, |
| } |
| ... |
| -- ASN1STOP |
| ``` |

For further details about the physical layer measurements, see TS 36.133 [16].

5.5.3.2.2 Layer 3 filtering of beam measurement results

The UE shall:

1> for each beam measurement quantity that the UE performs measurements according to 5.5.3.1:

2> filter the beam measured result, before using for measurement reporting, by the following formula:

$$F_n = (1-a) \cdot F_{n-1} + a \cdot M_n$$

where $M_n$ is the latest received measurement result from the physical layer;

$F_n$ is the updated filtered beam measurement result, that is used for measurement reporting;

$F_{n-1}$ is the old filtered beam measurement result, where $F_0$ is set to $M_1$ when the first measurement result from the physical layer is received; and $a = 1/2^{(k/4)}$, where k is the filterCoefficient for the corresponding beam measurement quantity received by the quantityConfig, where k can be configured differently for beam measurement results based on SS Block and CSI-RS;

2> adapt the filter such that the time characteristics of the filter are preserved at different input rates, observing that the filterCoefficient k assumes a sample rate equal to 200 ms;

NOTE 2: If k is set to 0, no layer 3 filtering is applicable.

NOTE 3: The filtering is performed in the same domain as used for evaluation of reporting criteria or for measurement reporting, i.e., logarithmic filtering for logarithmic measurements.

NOTE 4: The filter input rate is implementation dependent, to fulfil the performance requirements set in [16].

In a fifth embodiment, the UE can be configured to perform L types of measurements with L different filtering configurations. These measurements can be for the same RS type and same level. For example, the network can configure the UE to perform CSI-RS based beam-level measurements with a given filtering configuration a (with longer memory) and another filtering configuration a (with shorter memory). In another example, the network can configure the UE to perform SS Block based beam-level measurements with a given filtering configuration a (with longer memory) and another filtering configuration a (with shorter memory). In another example, the network can configure the UE to perform SS Block based cell-level measurements with a given filtering configuration a (with longer memory) and another filtering configuration a (with shorter memory). In another example, the network can configure the UE to perform CSI-RS based cell-level measurements with a given filtering configuration a (with longer memory) and another filtering configuration a (with shorter memory).

The method may also include the UE reporting these measurements with some indication that they are associated with their filtering configurations. One way to realize this flexibility could be to enable the network to configure the UE with multiple quantityConfig IEs per RAT, where each could be possibly associated to a measurement ID. Another possibility is to have the quantityConfig serve as an IE of the reportConfig instead of the measConfig.

In another embodiment, the network can indicate implicitly or explicitly whether the filter configurations are the same or different compared to a reference filter configuration (e.g., filter configuration for a specific type of measurements or signals or frequency may be considered as a reference). An implicit indication may be, for example, when the filtering configurations are different, they are provided by the network node. Otherwise, they can be assumed by the UE to be the same as a reference.

In yet another embodiment, two different filtering configurations are configured when the two measurements or the signals used for the measurements are characterized by one or more of: different numerologies, the difference in subcarrier spacing is above a threshold, the difference in the two carrier frequencies is above a threshold, the difference in periodicity of signals is above a threshold, the difference in bandwidths is above a threshold, at least one of the bandwidths is above a threshold, or the difference in sampling rate is above a threshold. Otherwise, the filtering configurations can be the same.

In yet another embodiment, a cell-level measurement based on one or more beam measurements has a different filtering configuration than that for the beam measurements used to determine the cell-level measurement when one or more conditions are met. This may include, for example, the periodicity of obtaining the cell-level measurement is different (e.g., less frequent) than obtaining the beam measurement and/or the number of beams is above a threshold. This may also include the difference between two or more beam measurements used to determine the cell-level measurement is above a threshold (e.g., RSRP of beam #1 is −70 dBm, RSRP of beam #2 is −110 dBm, so in this case the cell-level measurement may have a different filtering configuration than the filtering configuration of at least one of the two beams; RSRP of beam #1 is −70 dBm, RSRP of beam #2 is −90 dBm, so the cell-level measurement filtering configuration may be the same as for beam measurements). This may include the threshold for selecting beam measurements for determining cell-level measurement is below a threshold.

When the rules are known to the UE (e.g., pre-defined or indicated to the UE by a network node), then the UE determines at least one set of filtering configuration parameters (e.g., for a certain type of measurement) or at least a subset of filtering configuration parameters based on the determined rules (e.g., k1 is signaled while k2 is determined based on a rule, and both k1 and k2 are used to configure filtering function f(k1, k2) for a UE measurement).

In yet another embodiment, the filtering configuration (e.g., coefficient of Layer 3 filter) parameter for beam-level measurements may depend on the beam configuration (e.g., number of beams to be measured, number of SS blocks within the SS burst, etc.) of the beams on which the UE is expected to perform a beam level radio measurement. The relation between the filtering coefficient (K) and number of SS blocks per SS burst (L) can be based on any of: implementation in the network node (e.g., gNB, BS, etc.) when configuring the UE with the filtering parameters; a predefined rule; or a function or rule can be signaled to the UE.

An example of such a rule (which can be implemented, pre-defined, or configured) is $K=f(K_b, L)$, where $K_b$=reference coefficient value. Examples of functions are max, min, multiply, etc. In one specific example of the rule, $K=K_b*L$. In another example of the rule, the filtering coefficient (K) can be larger when larger number (L) of SS blocks are transmitted in the SS burst set or vice versa, e.g., K=8 and K=16 for L=4 and L=16 respectively. This enables the UE to perform more time domain averaging of signals when larger number of beams are transmitted by the network node. Because in this case (when there are more beams), the beams are narrower. Therefore, more time averaging is achieved by a larger value of K, which enhances the reliability of the measurement performed on beams. The enhancement in the reliability of the measurement results lead to more accurate execution of procedures (e.g., beam change, cell quality estimation, scheduling, power control, etc.) which rely on such measurements.

Another set of embodiments can be considered as more closely related to the configuration of RLM measurements used as inputs to RLF control, which includes such things as the triggering of an RLF timer, the stopping of the RLF timer, direct triggering of RLF, etc. It should be understood, however, that one or more of these embodiments may overlap and/or complement the embodiments described above.

In one embodiment, there is a parameter differentiation for RLM done on a single-beam configuration versus multi-beam configuration. According to that, the UE is configured with at least two sets of parameters associated with higher layer filtering used for time domain filtering the radio link quality estimated by the UE for the purpose of radio link monitoring: one set of such parameters are used for RLM done on single beam on a first type of reference signal (RS1) (e.g., RS1=CSI-RS) and another set of such parameters are used for RLM done on multiple beams (e.g., multi-beam RLM) on RS1. For example, the UE is configured with: a first set of parameters (N11 and N12) which are used for RLM based on single beam using RS1 and a second set of parameters (N11' and N12') which are used for RLM based on multiple beams using RS1. In another example, the UE is configured with: a third set of parameters (N21 and N22) which are used for RLM based on single beam using a second type of reference signal (RS2) and a fourth set of parameters (N21' and N22') which are used for RLM based on multiple beams using RS2. An example of RS2 is signals in SS blocks (e.g., SSS) according to another aspect the parameters N11', N12', N21' and N22' are further dependent on the beam configuration such as the number of beams used for RLM or the number of SS blocks within the SS burst set.

According to yet another embodiment, the UE is configured by the network node with at least two sets of parameters associated with higher layer filtering (e.g., time domain layer-3 filtering, etc.) used for time domain filtering the radio link quality estimated by the UE for the purpose of radio link monitoring using the same type of the reference signal. One set of the filtering parameters may be used by the UE for performing the RLM on single beam by estimating the DL radio link quality (e.g., signal quality such as SNR, SINR, etc.) using a certain type of reference signal (e.g., RSx). Another set of the filtering parameters may be used by the UE for performing the RLM on multiple beams (e.g., multi-beam RLM) also using RSx.

In multi-beam RLM the UE estimates the downlink signal quality of all the beams configured for doing RLM. Examples of RSx are CSI-RS, SSS, demodulation reference signal (DMRS), etc. The UE may further be configured with different sets of parameters for doing RLM for different types of reference signals. The second set of the parameters in the above case can further be associated with beam configurations. For example, the values of the parameters may linearly or non-linearly scale with the number of beams. These aspects are described below with a few examples below.

In one example, the UE can be configured by the network node with a first set of filtering parameters (e.g., N11 and N12) that are used by the UE for doing RLM based on single beam using a first set of reference signals (RS1). The parameters N11 and N12 are used for filtering the downlink signal quality used for out-of-sync detection and in-sync detection respectively in single-beam based RLM. For example, the UE starts the radio link failure timer (e.g., T310) when N11 consecutive out-of-sync indications are detected by the UE, and this timer is stopped when N12 consecutive in-sync indications are detected by the UE. A second set of parameters (N11' and N12') may be used by the UE for doing RLM based on multiple beams using RS1. The parameters N11' and N12' are used for filtering downlink signal quality used for out-of-sync detection and in-sync detection respectively in multi-beam based RLM. For example, the UE starts the radio link failure timer (e.g., T310) when N11' consecutive out-of-sync indications are detected by the UE, and this timer is stopped when N12' consecutive in-sync indications are detected by the UE.

In another example, the UE can be configured by the network node with a third set of parameters (N21 and N22) that are used by the UE for doing RLM based on single beam using a second type of reference signal (RS2). The parameters N21 and N22 are used for filtering downlink signal quality used for out-of-sync detection and in-sync detection respectively in single-beam based RLM. For example, the UE starts the radio link failure timer (e.g., T310) when N21 consecutive out-of-sync indications are detected by the UE, and this timer is stopped when N22 consecutive in-sync indications are detected by the UE. A fourth set of parameters (N21' and N22') may be are used for RLM based on multiple beams using RS2. The parameters N21' and N22' are used for filtering DL signal quality used for out-of-sync detection and in-sync detection respectively in multi-beam based RLM. For example, the UE starts the radio link failure timer (e.g., T310) when N21' consecutive out-of-sync indications are detected by the UE, and this timer is stopped when N22' consecutive in-sync indications are detected by the UE. An example of RS1 is CSI-RS. An example of RS2 is signals in SS blocks, e.g., SSS, etc.

According to another aspect of this embodiment, the filtering parameters (e.g., N11', N12', N21' and N22') used for filtering the estimated signal quality for RLM in multi-beam RLM are further associated with the beam configuration of the beams used for doing RLM. The association can be any of: pre-defined, implementation in the network node and configured by the network node in the UE. Examples of beam configuration parameters are number of beams used for RLM, number of SS blocks within the SS burst set etc. For example, if the number (P) of beams (e.g., SS blocks) used for multi-beam RLM based on SS block signal is above certain beam threshold then the value of the associated filtering parameter (e.g., N21' and/or N22') is above certain filtering threshold (G) otherwise the value of the associated filtering parameter is equal to or below G. For example, if P=4 then N21' and N22' are 2 and 4 respectively. But, if P=8 then N21' and N22' are 4 and 8 respectively.

In the previously described embodiments, another RLF related parameter that could be configured with similar level of granularity is the RLF timer, expressed in some of the previous examples as T310. In that case, there can be different values for single beam and multi-beam scenarios. There can be different values depending on the beamforming configuration. There can be different values for different RS types that are configured, e.g., a long value for SS Block based RLM compared to CSI-RS based RLM.

In the multi-beam case, one aspect may be the trigger conditions for events that output, e.g., out-of-sync indication. For a single beam case, it is, for example, the 2% hypothetical BLER. In multi-beam cases there are more options. A first option is for all beams that a UE follows fall below 2% hypothetical BLER (or other single-beam threshold). A second option is an event for counting one count towards N21' a configured number out of all followed beams fall below "a single-beam threshold". A third option is an event for counting one count towards N21' a configured number V out of all followed beams are above "a single-beam threshold" but rest are below. For example, the total number of followed beams is P=7. In the third option, a count towards N21' happens if the UE only sees V=2 beams above the configured single-beam threshold T'. V is sort of a safe margin to monitor the UE as it still sees at least V beams. If the UE is simultaneously configured with N21 and N22 (single-beam configuration), the UE would trigger a count towards N21 when the last beam is below a single-beam threshold T. Note that T' and T may have the same or different value, such as the same or different percentage hypothetical BLER.

The network can configure the UE to trigger RLF based on the maximum number of beam recovery attempts. In one embodiment, this maximum number of beam failure recovery attempts before RLF is declared can be configured separately, i.e., differently for beam recovery based on CSI-RS and SS Block.

Figure 3:
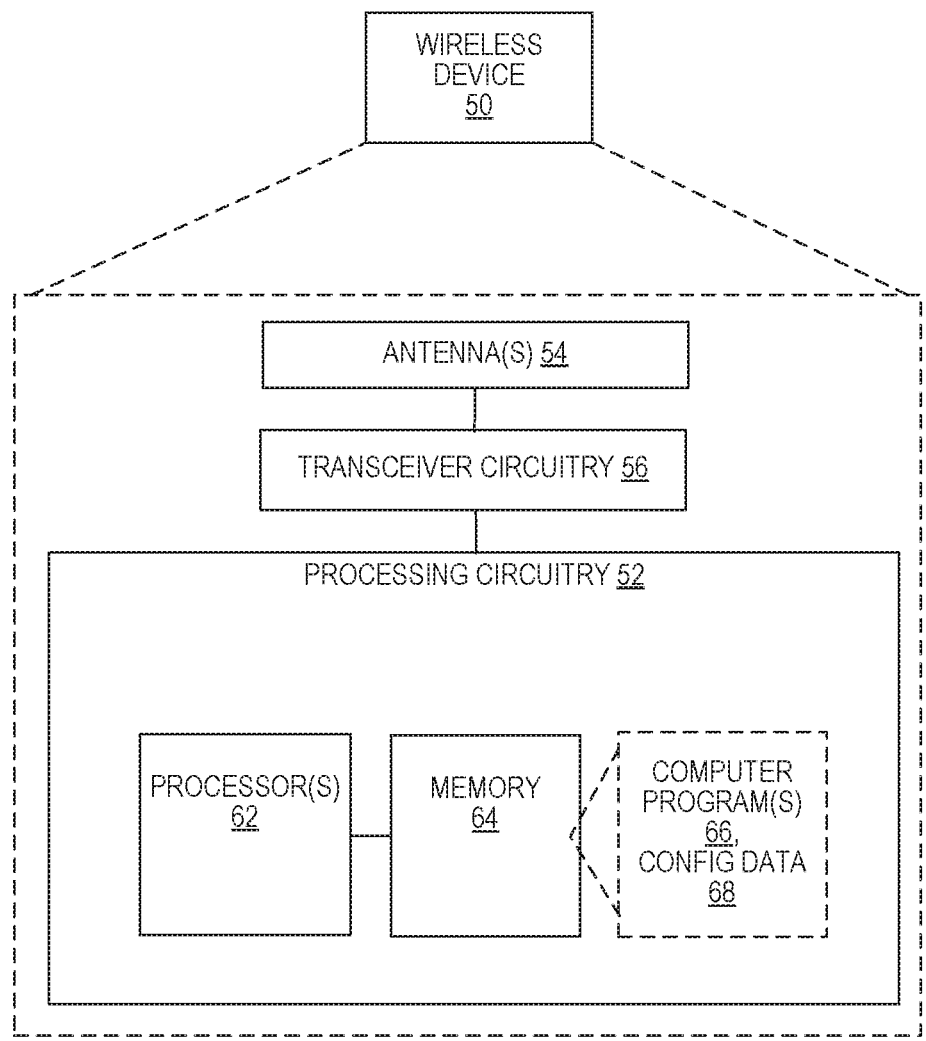
FIG. 3 is a block diagram illustrating a wireless device, according to some embodiments.

In accordance with some of the embodiments described above, FIG. 3 illustrates a block diagram of a wireless device 50, according to some embodiments. The wireless device 50 may be a UE, a radio communication device, target device (device targeted for communication), device-to-device (D2D) UE, machine type UE or UE capable of machine-to-machine (M2M), a sensor equipped with UE, iPAD device, tablet, mobile terminals, smart phone, LEE, LME, USB dongles, CPE, etc.

The wireless device 50 communicates with one or more nodes, via antennas 54 and transceiver circuitry 56. The transceiver circuitry 56 may include transmitter circuits, receiver circuits, and associated control circuits that are collectively configured to transmit and receive signals according to a radio access technology, for the purposes of providing cellular communication services. According to various embodiments, cellular communication services may be operated according to, for example, NR standards.

The wireless device 50 includes processing circuitry 52 that is operatively associated with the transceiver circuitry 56. The processing circuitry 52 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50.

In some embodiments, the processor 62 of the processing circuitry 52 may execute a computer program 66 stored in the memory 64 that configures the processor 62 to perform measurements for RRM and/or RLM. The processing circuitry 52 may be configured to perform a plurality of radio measurements. The processing circuitry 52 may also be configured to filter at least a first subset of the radio measurements using a first filtering configuration and filter at least a second subset of the radio measurements using a second filtering configuration, where the second filtering configuration differs from the first filtering configuration. The first and second filtering configurations apply to first and second different types of reference signals, respectively, or to beam-level measurements and cell-level measurements, respectively.

Figure 4:
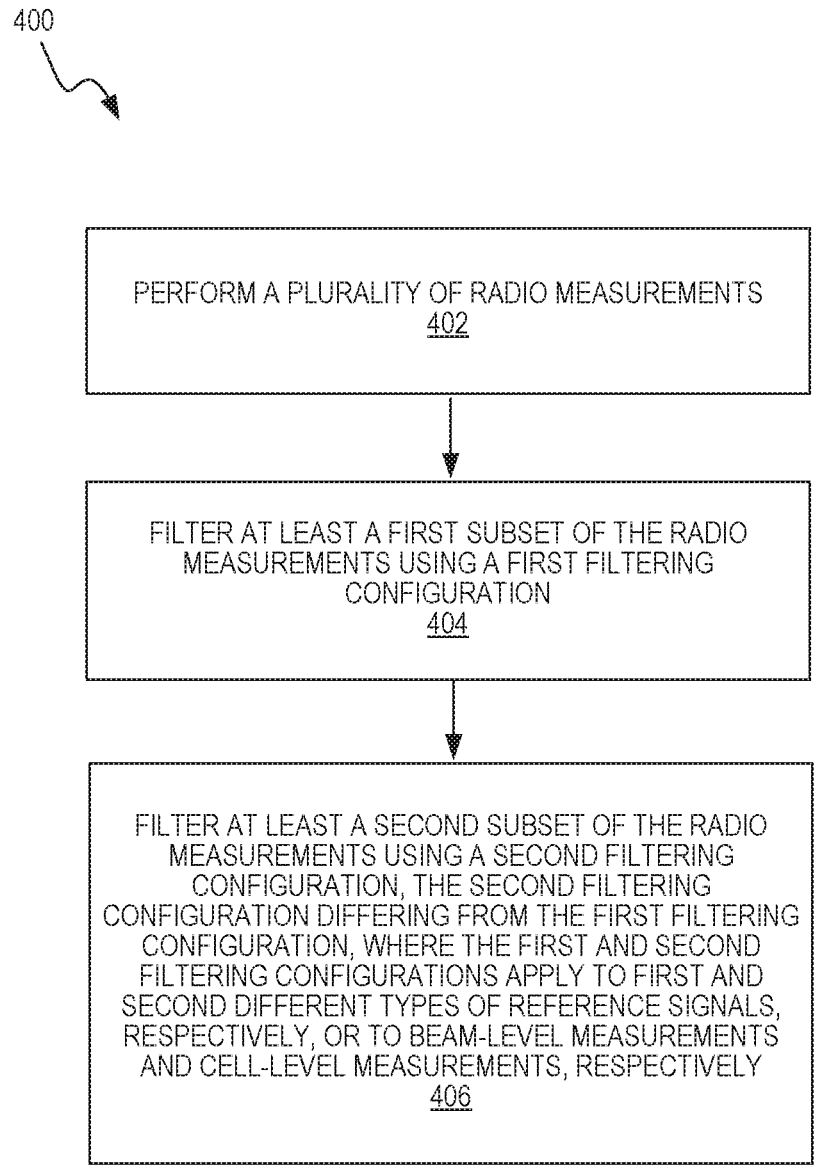
FIG. 4 shows a flow chart illustrating a method at a wireless device for performing measurements for RRM and/or RLM, according to some embodiments.

In some embodiments, the processing circuitry 52 is configured to perform a corresponding method of performing measurements for RRM and/or RLM, such as method 400 illustrated by FIG. 4. The method 400 includes performing a plurality of radio measurements (block 402), filtering at least a first subset of the radio measurements using a first filtering configuration (block 404) and filtering at least a second subset of the radio measurements using a second filtering configuration, (block 406), where the second filtering configuration differs from the first filtering configuration. The method 400 may further include performing Layer 1 filtering of measured radio samples to obtain the plurality of radio measurements.

The filtering using the first filtering configuration and the filtering using the second filtering configuration may each comprise Layer 3 filtering. The first and second filtering configurations may differ with respect to at least an averaging parameter.

The Layer 3 filtering for at least one of the filtering using the first filtering configuration and the filtering using the second filtering configuration may produce filtered cell-specific quality measurements. The method 400 may further include performing beam consolidation and selection, based on beam-specific radio measurements, prior to Layer 3 filtering of cell-specific quality measurements. The Layer 3 filtering for at least one of the filtering using the first filtering configuration and the filtering using the second filtering configuration may also produce filtered beam-specific quality measurements.

In some cases, the filtering using the first filtering configuration and the filtering using the second filtering configuration each comprise filtering for evaluating RLF. In these cases, the first and second filtering configurations may differ with respect to at least one of: a number of consecutive out-of-sync indications that trigger a start of a RLF timer; a number of consecutive in-sync indications that stop a running RLF timer; an RLF timer duration; and a maximum number of beam failure recovery attempts that trigger declaration of RLF or start of an RLF timer.

The first and second different types of reference signals may be a CSI-RS and a synchronization signal in a synchronization signal block, respectively. The method 400 may also include receiving signaling indicating at least one parameter of at least one of the first and second filtering configurations.

In some cases, at least one parameter of at least one of the first and second filtering configurations depends on at least one of: a periodicity of obtaining cell-level measurements or a periodicity of obtaining beam-level measurements, or both; a number of beams being measured; a difference in measurement value between two or more beam measurements used to determine a cell-level measurement; and a number of synchronization signal blocks with a synchronization signal burst.

Figure 5:
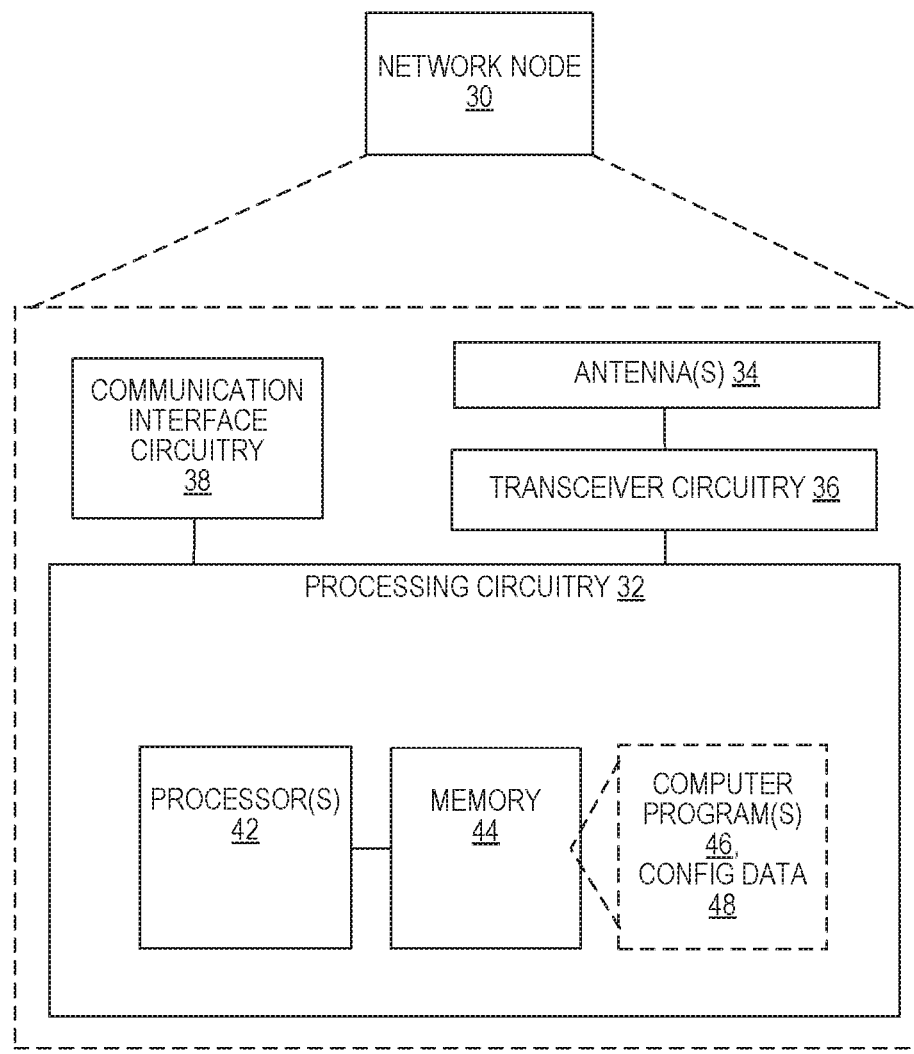
FIG. 5 is a block diagram illustrating a network node of a wireless communication network, according to some embodiments.

FIG. 5 illustrates an example of the network node 30, according to some embodiments. The network node 30 may be a radio access network node that facilitates communication between UEs and the core network. In using the generic terminology of "radio access network node," a radio access network node can be a base station, radio base station, base transceiver station, base station controller, network controller, evolved Node B (eNB), Node B, relay node, access point, radio access point, Remote Radio Unit (RRU) or Remote Radio Head (RRH). In the case where the transmitting device is a radio access network node, the radio access network node may include a communication interface circuit 38 that includes circuitry for communicating with other nodes in the core network, radio nodes, and/or other types of nodes in the network for the purposes of providing data and cellular communication services.

The network node 30 communicates with other devices via antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, including NR.

The network node 30 also includes one or more processing circuits 32 that are operatively associated with the transceiver circuitry 36 to communicate with other devices and, in some cases, operatively associated with the communication interface circuit 38 to communicate with network nodes. The communication may include multi-carrier operations. The term "multi-carrier" may involve similar terms such as "multi-carrier system", "multi-cell operation", "multi-carrier operation", and "multi-carrier" transmission and/or reception. Multi-carrier operation may also be considered to involve CA.

For ease of discussion, the one or more processing circuits 32 are referred to hereafter as "the processing circuitry 32." The processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuitry 32 and/or separate from the processing circuitry 32.

In some embodiments, the processor 42 of the processing circuitry 32 executes a computer program 46 stored in the memory 44 that configures the processor 42 to facilitate measurements for RRM and/or RLM. The processing circuitry 32 is configured to send, to a wireless device, information indicating a first filtering configuration for RRM and/or RLM and a second filtering configuration for RRM and/or RLM, where the second filtering configuration differs from the first filtering configuration. The first and second filtering configurations apply to first and second different types of reference signals, respectively, or to beam-level measurements and cell-level measurements, respectively.

In some embodiments, the processing circuitry 32 is configured to perform a corresponding method for facilitating measurements for RRM and/or RLM, such as method 600 illustrated by FIG. 6. The method 600 includes sending, to a wireless device, information indicating a first filtering configuration for RRM and/or RLM and a second filtering configuration for RRM and/or RLM, the second filtering configuration differing from the first filtering configuration (block 602).

The first and second filtering configurations may differ with respect to at least an averaging parameter for Layer 3 filtering. The first and second filtering configurations may also relate to filtering for evaluating RLF.

In some cases, the first and second filtering configurations differ with respect to at least one of: a number of consecutive out-of-sync indications that trigger a start of a RLF timer; a number of consecutive in-sync indications that stop a running RLF timer; an RLF timer duration; and a maximum number of beam failure recovery attempts that trigger declaration of RLF or start of an RLF timer.

The first and second different types of reference signals may be a CSI-RS and a synchronization signal in a synchronization signal block, respectively.

Figure 7:
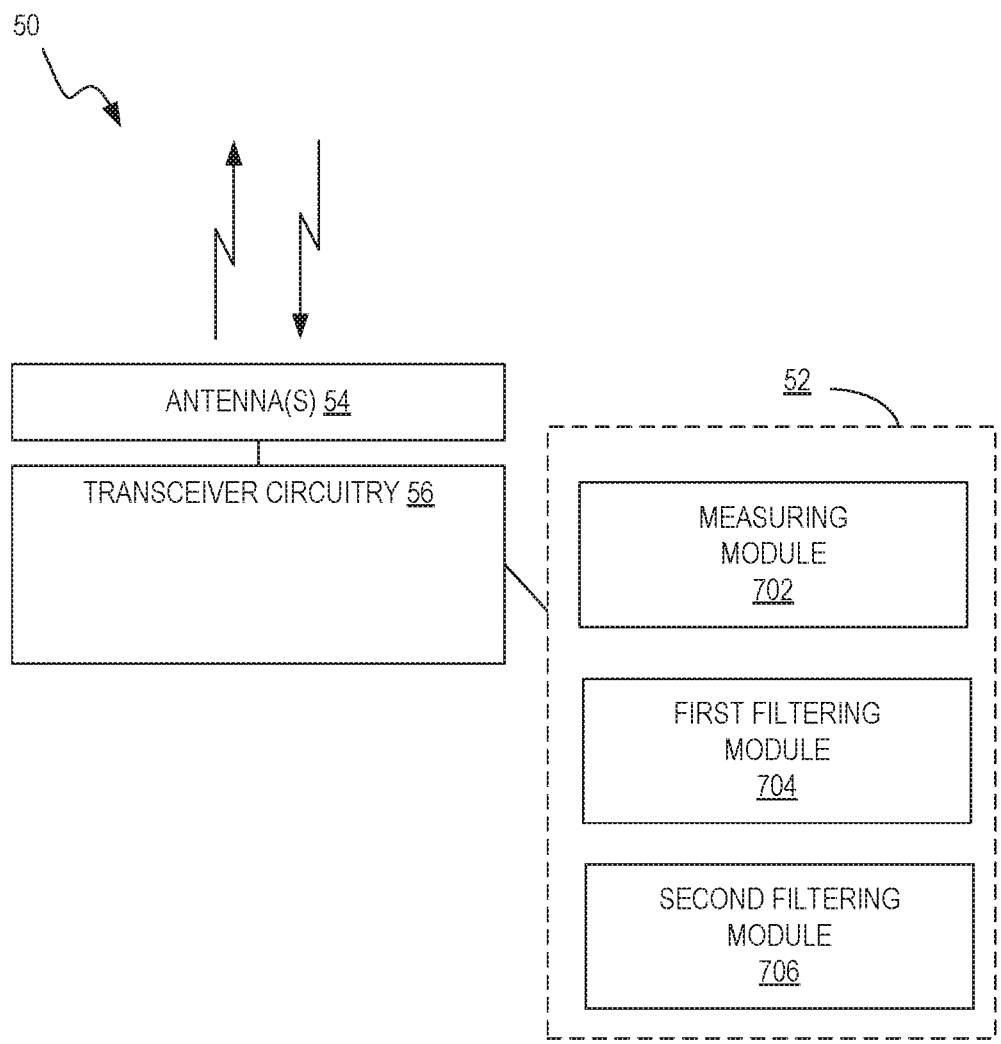
FIG. 7 is a block diagram illustrating a functional implementation of a wireless device, according to some embodiments.

FIG. 7 illustrates an example functional module or circuit architecture as may be implemented in a wireless device 50. The illustrated embodiment at least functionally includes a measuring module 702 for performing a plurality of radio measurements, a first filtering module 704 for filtering at least a first subset of the radio measurements using a first filtering configuration, and a second filtering module 706 for filtering at least a second subset of the radio measurements using a second filtering configuration, where the second filtering configuration differing from the first filtering configuration. The first and second filtering configurations apply to first and second different types of reference signals, respectively, or to beam-level measurements and cell-level measurements, respectively.

Figure 8:
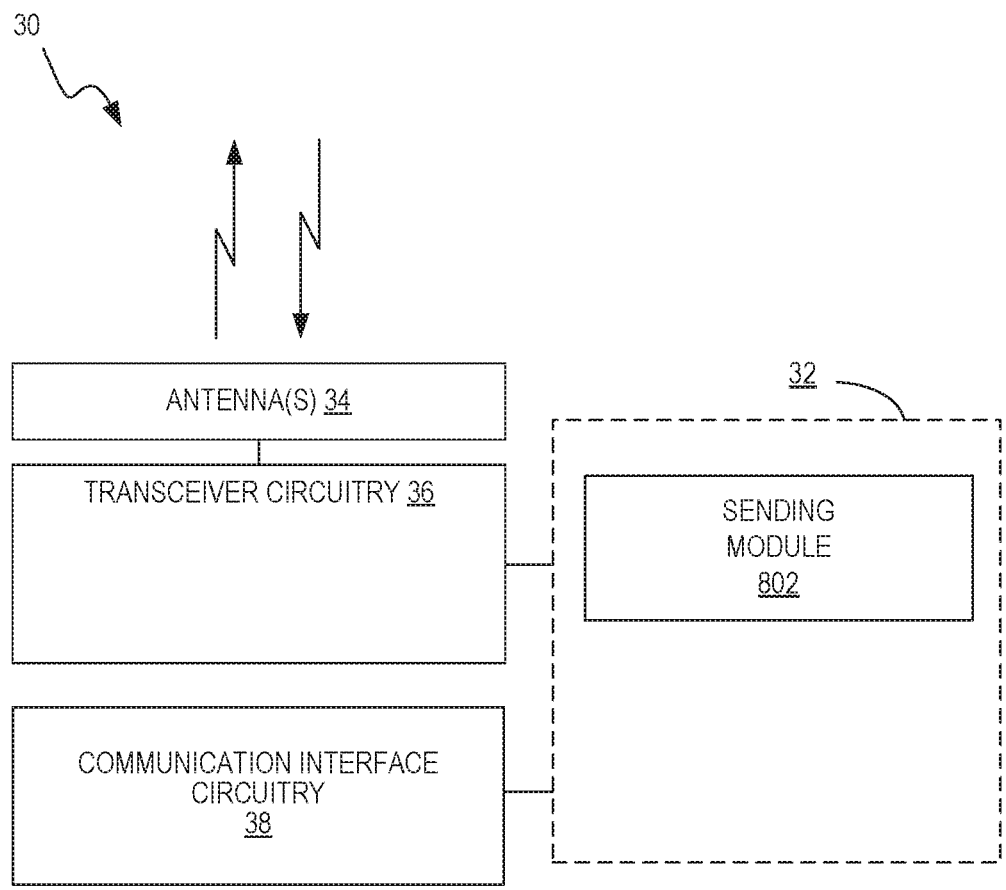
FIG. 8 is a block diagram illustrating a functional implementation of a network node, according to some embodiments.

FIG. 8 illustrates an example functional module or circuit architecture as may be implemented in a network node 30. The illustrated embodiment at least functionally includes a sending module 802 for sending, to a wireless device, information indicating a first filtering configuration for RRM and/or RLM and a second filtering configuration for RRM and/or RLM, where the second filtering configuration differs from the first filtering configuration. The first and second filtering configurations apply to first and second different types of reference signals, respectively, or to beam-level measurements and cell-level measurements, respectively.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless device, the method comprising:
performing a plurality of radio measurements;
filtering at least a first subset of the radio measurements using a first filtering configuration; and
filtering at least a second subset of the radio measurements using a second filtering configuration, the second filtering configuration differing from the first filtering configuration;
wherein the first and second filtering configurations apply to first and second different types of reference signals, respectively, and wherein the filtering using the first filtering configuration and the filtering using the second filtering configuration each comprise Layer 3 filtering.

2. The method of claim 1, further comprising performing Layer 1 filtering of measured radio samples to obtain the plurality of radio measurements.

3. The method of claim 1, wherein the first and second filtering configurations differ with respect to at least an averaging parameter.

4. The method of claim 1, wherein the Layer 3 filtering for at least one of the filtering using the first filtering configuration and the filtering using the second filtering configuration produces filtered cell-specific quality measurements.

5. The method of claim 4, further comprising performing beam consolidation and selection, based on beam-specific radio measurements, prior to Layer 3 filtering of cell-specific quality measurements.

6. The method of claim 1, wherein the Layer 3 filtering for at least one of the filtering using the first filtering configuration and the filtering using the second filtering configuration produces filtered beam-specific quality measurements.

7. The method of claim 1, wherein the filtering using the first filtering configuration and the filtering using the second filtering configuration each comprise filtering for evaluating radio-link failure (RLF).

8. The method of claim 7, wherein the first and second filtering configurations differ with respect to at least one of: a number of consecutive out-of-sync indications that trigger a start of a RLF timer; a number of consecutive in-sync indications that stop a running RLF timer; an RLF timer duration; and a maximum number of beam failure recovery attempts that trigger declaration of RLF or start of an RLF timer.

9. The method of claim 1, wherein the first and second different types of reference signals are channel-state information reference signals (CSI-RS) and a synchronization signal in a synchronization signal block, respectively.

10. The method of claim 1, further comprising receiving signaling indicating at least one parameter of at least one of the first and second filtering configurations.

11. The method of claim 1, wherein at least one parameter of at least one of the first and second filtering configurations depends on at least one of:
a periodicity of obtaining cell-level measurements or a periodicity of obtaining beam-level measurements, or both;
a number of beams being measured;
a difference in measurement value between two or more beam measurements used to determine a cell-level measurement; and a number of synchronization signal blocks with a synchronization signal burst.

12. A method in a network node, the method comprising:
sending, to a wireless device, information indicating a first filtering configuration for radio resource management (RRM) and a second filtering configuration for RRM, the second filtering configuration differing from the first filtering configuration;
wherein the first and second filtering configurations apply to first and second different types of reference signals, respectively, and wherein the first and second filtering configurations are each for Layer 3 filtering.

13. The method of claim 12, wherein the first and second filtering configurations differ with respect to at least an averaging parameter for Layer 3 filtering.

14. The method of claim 12, wherein the first and second filtering configurations relate to filtering for evaluating radio-link failure (RLF).

15. The method of claim 14, wherein the first and second filtering configurations differ with respect to at least one of: a number of consecutive out-of-sync indications that trigger a start of a RLF timer; a number of consecutive in-sync indications that stop a running RLF timer; an RLF timer duration; and a maximum number of beam failure recovery attempts that trigger declaration of RLF or start of an RLF timer.

16. The method of claim 12, wherein the first and second different types of reference signals are channel-state information reference signals (CSI-RS) and a synchronization signal in a synchronization signal block, respectively.

17. A wireless device, comprising:
transceiver circuitry configured to transmit and receive radio signals; and
processing circuitry operatively associated with the transceiver circuitry and configured to:
perform a plurality of radio measurements;
filter at least a first subset of the radio measurements using a first filtering configuration; and
filter at least a second subset of the radio measurements using a second filtering configuration, the second filtering configuration differing from the first filtering configuration;
wherein the first and second filtering configurations apply to first and second different types of reference signals, respectively, and wherein the filtering using the first filtering configuration and the filtering using the second filtering configuration each comprise Layer 3 filtering.

18. The wireless device of claim 17, wherein the processing circuitry is configured to perform Layer 1 filtering of measured radio samples to obtain the plurality of radio measurements.

19. The wireless device of claim 17, wherein the first and second filtering configurations differ with respect to at least an averaging parameter.

20. The wireless device of claim 17, wherein the Layer 3 filtering for at least one of the filtering using the first filtering configuration and the filtering using the second filtering configuration produces filtered cell-specific quality measurements, and wherein the processing circuitry is configured to perform beam consolidation and selection, based on beam-specific radio measurements, prior to Layer 3 filtering of cell-specific quality measurements.

21. The wireless device of claim 17, wherein the Layer 3 filtering for at least one of the filtering using the first filtering configuration and the filtering using the second filtering configuration produces filtered beam-specific quality measurements.

22. The wireless device of claim 17, wherein the processing circuitry is configured to filter using the first filtering configuration and the filter using the second filtering configuration, wherein each comprise filtering for evaluating radio-link failure (RLF).

23. The wireless device of claim 22, wherein the first and second filtering configurations differ with respect to at least one of: a number of consecutive out-of-sync indications that trigger a start of a RLF timer; a number of consecutive in-sync indications that stop a running RLF timer; an RLF timer duration; and a maximum number of beam failure recovery attempts that trigger declaration of RLF or start of an RLF timer.

24. The wireless device of claim 17, wherein the first and second different types of reference signals are channel-state information reference signals (CSI-RS) and a synchronization signal in a synchronization signal block, respectively.

25. The wireless device of claim 17, wherein at least one parameter of at least one of the first and second filtering configurations depends on at least one of:
a periodicity of obtaining cell-level measurements or a periodicity of obtaining beam-level measurements, or both;
a number of beams being measured;
a difference in measurement value between two or more beam measurements used to determine a cell-level measurement; and
a number of synchronization signal blocks with a synchronization signal burst.

26. A network node, comprising:
transceiver circuitry configured to communicate with a wireless device; and
processing circuitry operatively associated with the transceiver circuitry and configured to:
send, to the wireless device via the transceiver circuitry, information indicating a first filtering configuration for radio resource management (RRM) and a second filtering configuration for RRM, the second filtering configuration differing from the first filtering configuration;
wherein the first and second filtering configurations apply to first and second different types of reference signals, respectively, and wherein the first and second filtering configurations are each for Layer 3 filtering.

27. The network node of claim 26, wherein the first and second filtering configurations differ with respect to at least an averaging parameter for Layer 3 filtering.

28. The network node of claim 26, wherein the first and second filtering configurations relate to filtering for evaluating radio-link failure (RLF) and wherein the first and second filtering configurations differ with respect to at least one of: a number of consecutive out-of-sync indications that trigger a start of an RLF timer; a number of consecutive in-sync indications that stop a running RLF timer; an RLF timer duration; and a maximum number of beam failure recovery attempts that trigger declaration of RLF or start of an RLF timer.

* * * * *

UNITED STATES PATENT AND TRADEMARK OFFICE
CERTIFICATE OF CORRECTION

PATENT NO. : 11,451,991 B2
APPLICATION NO. : 16/819342
DATED : September 20, 2022
INVENTOR(S) : da Silva et al.

It is certified that error appears in the above-identified patent and that said Letters Patent is hereby corrected as shown below:

On the Title Page

On Page 2, item (56), under "OTHER PUBLICATIONS", in Column 2, Line 43, delete "99#32[NR] Tp" and insert -- [99#32][NR] TP --, therefor.

In the Specification

In Column 2, Lines 61-62, delete "trigger Quantity and report Quantity." and insert -- triggerQuantity and reportQuantity. --, therefor.

In Column 12, Line 49, delete "a=1/2(k/4)," and insert -- $a=1/2^{(k/4)}$, --, therefor.

In Column 13, Line 17, delete "a=1/2(k/4)," and insert -- $a=1/2^{(k/4)}$, --, therefor.

Signed and Sealed this
Eleventh Day of April, 2023

Katherine Kelly Vidal
*Director of the United States Patent and Trademark Office*